United States Patent [19]
Antoine

[11] Patent Number: 5,219,430
[45] Date of Patent: Jun. 15, 1993

[54] HYDRAULIC DAMPER AND ELASTIC-RETURN STRUT COMPRISING SUCH A DAMPER

[75] Inventor: Aubry J. Antoine, Cabries, France

[73] Assignee: Aérospatiale Société Nationale Industrielle, Paris, France

[21] Appl. No.: 961,970

[22] Filed: Oct. 16, 1992

Related U.S. Application Data

[62] Division of Ser. No. 668,655, Mar. 13, 1991, Pat. No. 5,178,241.

[30] Foreign Application Priority Data

Mar. 13, 1990 [FR] France .................. 90 03193

[51] Int. Cl.$^5$ ............................ F16F 9/20; F16F 9/34
[52] U.S. Cl. .................. 267/140.12; 188/282; 188/298; 188/312; 188/317; 188/322.15; 267/219; 267/220; 416/106; 416/134 A; 416/140; 416/500
[58] Field of Search .............. 188/280, 282, 284, 285, 188/298, 312, 317, 322.15; 267/219, 220, 140.12; 416/106, 140 R, 140 A, 134 A, 500

[56] References Cited

U.S. PATENT DOCUMENTS

| | | | |
|---|---|---|---|
| 2,802,664 | 8/1957 | Jackson | 188/298 X |
| 2,886,142 | 5/1959 | Orshansky, Jr. | 188/317 X |
| 3,638,885 | 2/1972 | Reed | 416/106 X |
| 4,898,264 | 2/1990 | Miller | 188/280 X |

FOREIGN PATENT DOCUMENTS

| | | |
|---|---|---|
| 0334716 | 9/1989 | European Pat. Off. . |
| 950592 | 9/1949 | France . |
| 1003247 | 3/1952 | France . |
| 1165327 | 10/1958 | France . |
| 1194294 | 11/1959 | France . |
| 1326586 | 3/1962 | France . |
| 1323746 | 3/1963 | France . |
| 2592696 | 7/1987 | France . |
| 2629163 | 9/1989 | France . |
| 1061567 | 3/1967 | United Kingdom . |

Primary Examiner—George E. A. Halvosa
Attorney, Agent, or Firm—Nikaido, Marmelstein, Murray & Oram

[57] ABSTRACT

The hydraulic damper according to the invention has at least one restricted communication passage (47) between its two working chambers (8, 9) whose cross section is controlled by a viscous restriction valve (51) positioned via a control pressure of a fluid of a control damper with at least one secondary chamber (41, 42) delimited in a secondary cylinder (39) by a control piston (40), which cylinder and control piston are integrally attached, one to the main body (1), the other to the damping piston (4) of the damper, such that the damping law of the control fluid positioning said valve (51) is linked to the relative displacements of the main body (1) and damping piston (4).

Application to the equipping of elastic-return struts with integral damping, in particular for helicopter rotors and blades. FIG. 2.

7 Claims, 4 Drawing Sheets

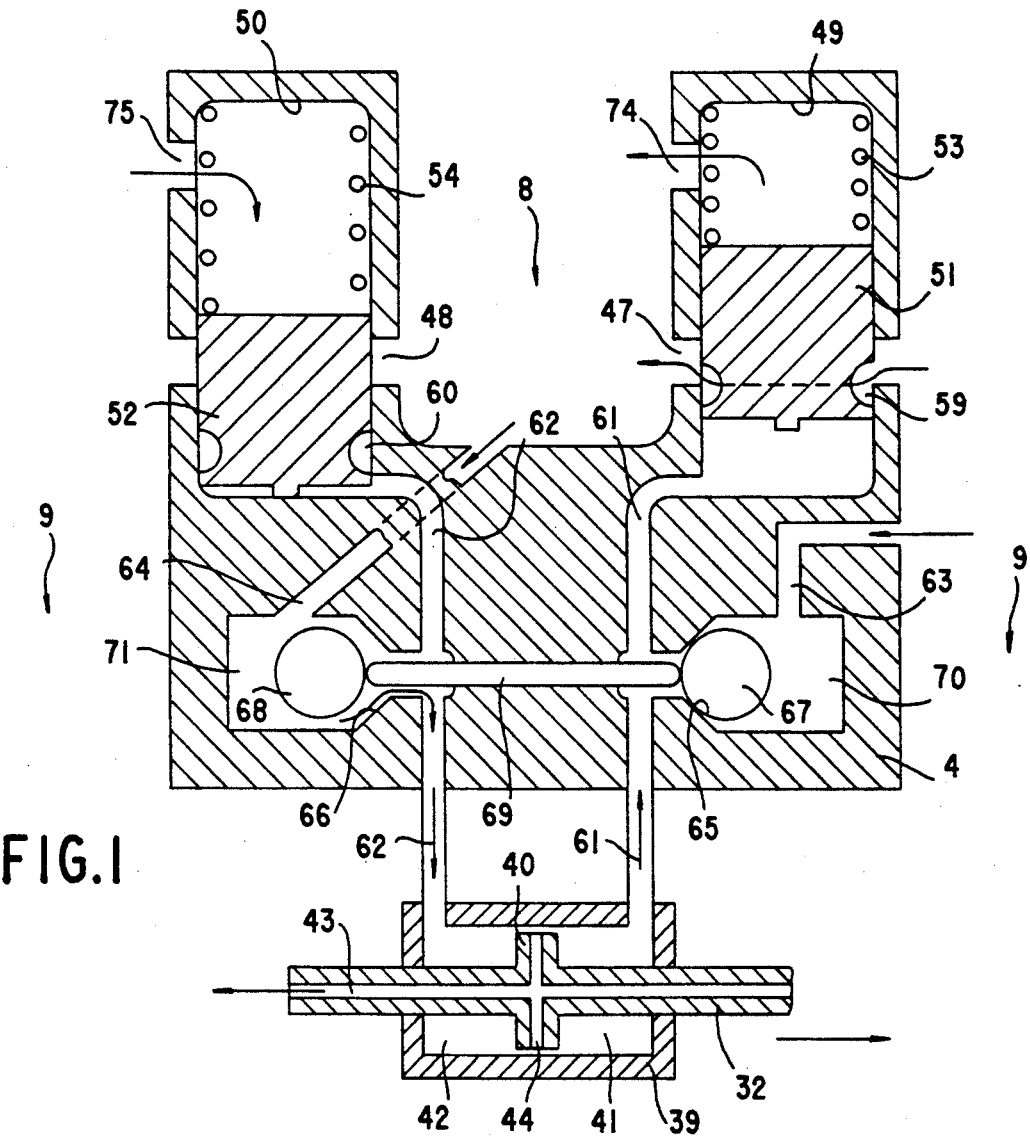
FIG. 1
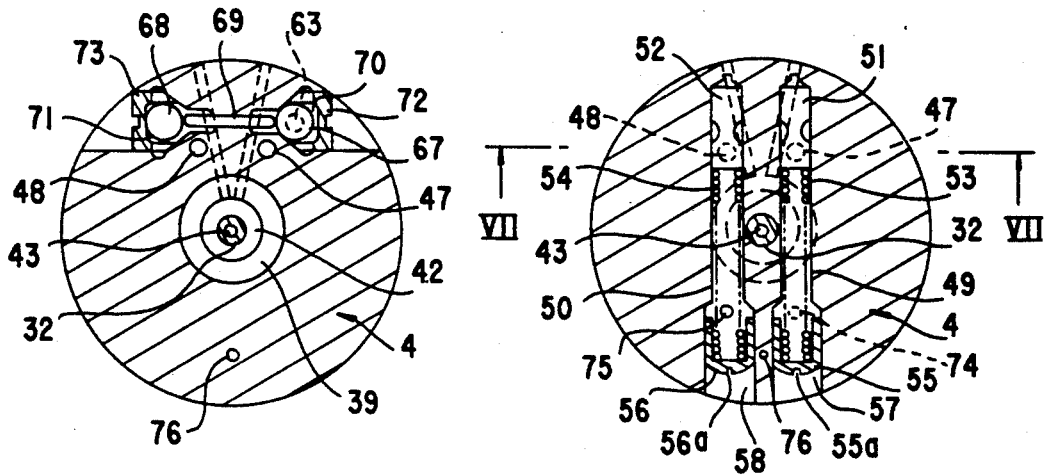
FIG. 3
FIG. 4

HYDRAULIC DAMPER AND ELASTIC-RETURN STRUT COMPRISING SUCH A DAMPER

This is a division of application Ser. No. 668,655 filed Mar. 13, 1991, U.S. Pat. No. 5,178,241.

FIELD OF THE INVENTION

The present invention relates to a hydraulic damper, in particular a damper of the type with linear damping by viscous restriction of a fluid which is preferably highly viscous, as well as to an elastic-return strut comprising such a damper, and more precisely of the elastohydraulic type with integral damping.

More particularly, the damper proposed by the invention has a structure which enables it to adjust its own damping in accordance with an optimised law which is a function of only the damped relative displacement. The strut proposed by the invention is particularly intended for equipping the rotors of aerodynes with rotary wing units and, more especially helicopter rotors.

PRIOR ART

Servocontrolled dampers have already been known for a long time and used particularly in the field of aeronautics, as is disclosed, for example, by the document FR-950,592, regarded as state of the art and relating to a self-adjusting damper for the front wheel of aeroplane three-wheel landing gear.

The device proposed in this document essentially comprises a main cylinder, in which a piston is mounted movably in translation and in a leaktight manner in said cylinder. The stroke of this piston is damped by the compression of a liquid, such as oil, which the movement of said piston causes to pass from one chamber to another of the main cylinder via a diaphragm. This diaphragm is associated with an adjustment finger which, according to its positioning, more or less closes the orifice of said diaphragm and thus adjusts the opening cross section of the latter. The positioning of this adjustment finger is controlled by the antagonistic actions of a spring which pushes said adjustment finger towards a position of maximum opening of the orifice of said diaphragm, and of the pressure of a fluid derived from the circuit supplying the brakes of the wheel.

By virtue of such a structure, the adjustment of the damper is directly subject to the braking pressure developed, for example on landing. However, it should be noted that, if such a device effectively permits automatic adjustment of damping, this adjustment is not directly controlled by the damping stroke, but by an element or parameter external to the damper.

A damper is also known, from Patent FR-1,003,247, which has two cylindrical chambers each filled at least partially with a liquid, such as oil, passing from one to the other of the two chambers through the action of the movement of a damping piston, via a damping orifice. This damping orifice is associated with a valve which is intended to close it, said valve being actuated by the pressure of an external fluid.

Such a device also makes it possible to achieve servocontrol of the damper. The damping law is, however, in this case also, a function of a parameter external to the damper and is not directly a function of the stroke of the damping piston in its main cylinder.

Patent FR-1,165,327 discloses an adjustment system for suspension dampers which essentially comprises, in a main body, a slidably mounted main piston. Said piston has two communication passages passing through it between the two chambers it delimits in the main body. These passages are themselves associated with valves closing them, respectively, during phases of expansion or of delivery. This main piston is mounted on an actuating rod associated with at least two complementary elements which together delimit a secondary chamber with a variable volume. One of these elements is fixed relative to said rod. The other can slide relative to the latter and is intended to compress a spring mounted about said rod, said spring acting on at least one of said valves and pushing it against its seat. A channel emerges into this secondary chamber and extends in the rod, feeding said secondary chamber with a control fluid whose pressure adjusts the load of the valve or valves, and thus the damping.

However, the adjustment thus obtained is, in this case also, an external adjustment, remotely controlled, which is in no way influenced by the respective positions of the damping piston and of the main body. Moreover, it should be noted that, in such a device, the control fluid does not act directly on the valves with which it is associated, but acts on them via multiple parts which increase the complexity of the assembly and of the functioning of the device.

As an example of an externally servocontrolled damper, the vehicle oil damper disclosed by document FR-1,194,294 should also be mentioned, the functioning of which is substantially similar to that of the dampers described above, the cross section of the passages for restricting the oil being controlled by adjustment valves whose positioning is controlled by an external member.

The subject of Patent FR-1,323,746 is a damper whose damping is directly servocontrolled by the intensity of the oscillations to which said damper is subjected. This damper conventionally comprises a main damping piston which is movable in a main damper cylinder, the width of said piston having main passages passing through it which permit the flow of the fluid between the two working chambers delimited by said piston in the main cylinder. The rod on which the piston is mounted comprises, inside, a bore which acts as a housing for a slide valve. The body of said valve is pierced axially by a central orifice, the two auxiliary chambers delimited in said bore by said valve each being respectively placed in communication via auxiliary passages passing through the walls of said bore, with one of the two working chambers on each side of the main piston. The position of said valve in its bore controls the opening cross sections of said passages and thus the flow of the damping fluid from one working chamber to the other, via the auxiliary chambers.

Such a structure enables the damper to adapt itself, on its own, to the stresses it experiences. However, the damping law achieved depends on the relative pressures in the two working chambers and not directly on the respective positions of the damping piston and of the main cylinder. Damping may in particular be of differing intensities for one and the same relative position of the damping piston and of the main cylinder. Moreover, the damping law is influenced by the cross section of the auxiliary passages which varies according to a decreasing friction of the loss of charge at the slide valve without this loss of charge controlling the variation in the flow cross section via the main passages of the damper.

The use of a slide valve to lower the operating pressures of a damper is further described in Application FR-2,597,952, which discloses the use of such a slide valve in order to open an auxiliary passage of very large cross section when the passage cross section of the main restriction ports of the damper is insufficient to prevent critical variations in pressure in the damper.

As for the struts, elastic-return struts with integral damping, of hydroelastic type, have already been described, particularly in the Applicant's Patents FR-2,592,696 and FR-2,629,163. Such struts are particularly intended, on the lifting rotors of a helicopter with an articulated-type boss, to damp the angular oscillations of the blades in the plane of rotation of the rotor (drag damping), by virtue of a hydraulic damping device. At the same time, these struts provide an energetic elastic return of the blades in drag, by the deformation of a mass of flexible material.

Such struts conventionally comprise essentially two rigid members each equipped with articulation means intended to connect one of the rigid members to a first part, such as a blade or a member for joining said blade to a rotor boss, and the other rigid member to a second part, such as the rotor boss. These struts also comprise at least one elastic-return member comprising a mass of deformable material attached to the two rigid members and intended to be deformed when said rigid members are displaced relative to one another, and to exert an elastic-return action on said rigid members which tends to bring them back into an initial relative position. Moreover, they are equipped with at least one hydraulic damper, comprising two working chambers with a volume which is variable in the opposite direction, which contain a relatively viscous hydraulic fluid intended to pass from one to the other of said chambers via at least one restricted passage communicating between said working chambers, when said rigid members are displaced relative to one another, in order to produce a damping effect on the relative displacement of said rigid members.

SUMMARY OF THE INVENTION

An object of the invention is to propose a damper which makes it possible to achieve an optimised damping law which is directly a function of the damped relative displacements. To this end, the invention proposes, in particular, a device which permits control of the opening cross section of at least one restricted passage of the damper, via the hydraulic fluid of a second damper substantially incorporated in the main damper, the relative displacement of the elements of this second damper being controlled directly by the damping stroke of the main damper.

Such a damper is more particularly, but not exclusively, adapted for struts of the abovementioned type, in respect of which it is intended to achieve an optimised damping law, with damping gradients which differ according to the value of the dynamic displacements of the two members with which each strut is fitted.

A first subject of the invention is thus a hydraulic damper comprising, in a main body, two working chambers with a volume which is variable in the opposite directions, said working chambers containing a main viscous fluid intended to pass from one to the other via at least one restricted communication passage, through the action of the thrust of a damping piston being displaced in said body, the opening cross section of at least one communication passage being controlled by the positioning, relative to said passage, of a viscous restriction valve on which a control fluid acts, this hydraulic damper being defined in that the control fluid is contained principally in at least one secondary chamber delimited in a secondary cylinder by a control piston mounted slidably in said cylinder, said secondary chamber being associated with a channel for conveying the control fluid from said secondary chamber as far as the viscous restriction valve through the action of the control piston, said secondary cylinder and said control piston being integrally attached, one to the main body, the other to the damping piston. The invention also proposes a hydraulic damper in which the opening of the restricted passage or passages is controlled by controlling the stroke of the viscous restriction valves with the aid of a pressurised control fluid delivered by a hydraulic generator incorporated in the damper and sensitive to the relative displacements of the two fastenings of the damper. When the damper is linear, the hydraulic generator is linked to the relative linear displacements of the two fastenings between which the damper is mounted, and this hydraulic generator comprises the control piston linked to a fastening of the damper, and mounted slidably advantageously with a viscous restriction choke in the secondary cylinder, linked to the other fastening of the damper, in order to deliver the control fluid at an average pressure which is sufficient to control the displacements of the viscous restriction valve or valves.

The control piston is advantageously integrally attached to the main body, the secondary cylinder being integrally attached to the damping piston. The control fluid may be contained mainly in two secondary chambers delimited, in the secondary cylinder, by the control piston mounted slidably in said cylinder. It is thus possible totally to integrate the device for controlling the viscous restriction valves in the general construction of the damper.

In an advantageous embodiment, the damper comprises, in its main body, a damping cylinder in which the two working chambers are delimited by the damping piston, said damping piston being mounted on a main movable rod passing through at least one of the working chambers, the secondary cylinder extending at least partially longitudinally into the main movable rod, the control piston being mounted on a secondary rod which is movable in longitudinal translation inside said secondary cylinder and integrally attached to the main body. It can also comprise a device to compensate for the thermal expansions of the hydraulic fluid and/or the variations in the volumes containing said fluid, comprising at least one compensation chamber associated with a compensation circuit housed at least partially in the main movable rod, the secondary movable rod sliding at least partially inside the main movable rod, in the compensation circuit. The compensation circuit may extend partially into the secondary movable rod and emerge from said secondary movable rod in the portion of said compensation circuit which is located inside the main movable rod.

Still in an advantageous manner, at least one secondary chamber communicates via a supplementary channel with the compensation circuit, which permits the absorption in the compensation chamber of the thermal expansions of the control fluid which is then the same fluid as the viscous fluid of the damper. The control piston may, in particular, be mounted in the secondary cylinder with a viscous restriction play, the supplementary channel being disposed radially in said control piston and permitting the communication of each of the two secondary chambers with the portion of the compensation circuit which extends into the secondary movable rod.

The secondary movable rod preferably extends into a first working chamber from the main body, into the portion of the compensation circuit which is located in the main movable rod, passing through the secondary cylinder, the main movable rod extending beyond the damping piston into the compensation chamber, passing through the second working chamber, the portion of the compensation circuit housed in said main movable rod emerging into said compensation chamber.

The damper may, in particular, comprise an auxiliary chamber connected to the compensation chamber via at least one compensation channel, the working chambers being disposed between said compensation chamber and the auxiliary chamber, said auxiliary chamber having the secondary movable rod passing through it. This auxiliary chamber may have the main movable rod passing at least partially through it.

In an advantageous embodiment, one of the ends of the main movable rod is displaced in said auxiliary chamber, the compensation circuit extending into the secondary movable rod and into the main movable rod in order to emerge, towards one of its ends, from the secondary movable rod into the auxiliary chamber and, towards its other end, from the main movable rod into the compensation chamber. The compensation chamber may, in particular, be at least partially delimited on the inside by a flexible wall in the form of bellows.

In a further equally advantageous embodiment, the main movable rod passes right through the auxiliary chamber, a compensation channel extending into the main body. The auxiliary chamber may be included between a working chamber and a charging chamber in which one of the ends of the main movable rod is displaced, at least one wall separating said auxiliary chamber and said charging chamber, said wall having a restricted communication orifice passing through it. The charging chamber may have the secondary movable rod passing through it.

Still preferentially, each of the two secondary chambers is associated, via a transportation channel, with a viscous restriction valve. The damper may, in particular, comprise, between the two working chambers, two restricted communication passages and two viscous restriction valves each controlling, respectively, via its positioning, the opening cross section of each of said communication passages, each of these two valves being associated, respectively, with one of the secondary chambers.

A viscous restriction valve is advantageously in balance between, on the one hand, the positioning pressure exerted on it by the control fluid and, on the other hand, a return spring, in particular a compression spring. A viscous restriction valve may, in particular, be a shutter mounted slidably in a bore, in which it slides in a leak-tight manner, said bore having a communication passage between the two working chambers passing through it at the level of said valve, said valve comprising a groove intended to connect together, inside the bore, the two ends of said passage and to adjust, according to the position of said groove relative to said ends, the opening cross section of said passage, one of the two portions of the bore which are disposed on either side of said valve being directly connected via a transportation channel, to a secondary chamber. In the rest position, a viscous restriction valve may, for example, substantially close the entire communication passage with which it is associated.

The damper may also comprise a supplementary or permanent restricted communication passage, with a constant cross section for example, intended to permit the passage of the main fluid from one to the other of the two working chambers when the other communication passage(s) is(are) substantially closed by the viscous restriction valve(s) with which it (they) is (or are) associated.

Still preferentially, each secondary chamber can be associated with a transfer circuit permitting a flow of fluid from one of the working chambers towards said secondary chamber, when said secondary chamber fills up. Each working chamber may be connected, via a transfer circuit, to a first secondary chamber and connected, via a complementary circuit, to the second secondary chamber, so as to permit the transfer, when said second secondary chamber empties, of substantially the quantity of fluid by which said second secondary chamber is emptied, from said second secondary chamber towards said first secondary chamber, by means of a main chamber. More particularly, that one of the two portions of bore disposed on either side of the viscous restriction valve which slides in this bore and which is opposite the transportation channel connecting said bore to a secondary chamber, emerges, via complementary conduits, into the working chamber connected via a transfer circuit to the other of said second chambers, thus producing, with said transportation channel, a complementary circuit.

In an advantageous manner, a working chamber associated with a secondary chamber via a transfer circuit fills at the same time as said secondary chamber.

Still in an advantageous manner, at least a portion of the transfer circuit is associated with a differential valve intended to close it when the secondary chamber associated with said transfer circuit empties. A differential valve may, in particular, be closed through the action of the pressure of the fluid in the working chamber in which the transfer circuit associated with said differential valve emerges when said working chamber empties. The differential valves of the transfer circuits of each of the two secondary chambers are functionally and/or structurally combined with one another, one being in the closed position, bearing on its seat, while the other is in the open position.

A transfer circuit preferably emerges into the secondary chamber with which it is associated, via the transportation channel associated with said secondary chamber. The body or main cylinder, the main rod, the secondary cylinder and the secondary rod can have coincident axes. The bore of a viscous restriction valve can extend into the damping piston, perpendicularly to the axis of the main rod. The differential valves can also be disposed in the damping piston, symmetrically relative to the viscous restriction valves and perpendicularly to the axis of the main rod.

A further subject of the invention is an elastic-return strut with integral damping, of elastohydraulic type, in particular for controlling the alternated angular movements of the blades of a rotor of an aerodyne with a rotary wing unit in the plane of rotation of said blades, comprising:

two rigid members each equipped with articulation means intended to connect one of the rigid members to a first part, such as a blade or a member for joining said blade to the boss of the rotor, and the other rigid member to a second part, such as said boss of the rotor;

at least one elastic-return member comprising a sleeve in an elastically deformable material adhering in a leaktight manner via its inner and outer lateral surfaces, respectively, between inner and outer rigid tubular sections respectively, substantially coaxial with respect to the axis of the strut and each integrally attached to one, respectively, of the two rigid members, so that the sleeve is deformed in shear, when the two rigid members are displaced relative to one another substantially according to the general axis of the strut and when the sleeve exerts an elastic return action on said rigid members which tends to bring them back into an initial relative position; and a hydraulic damper according to the invention, whose main body forms one of the two rigid members, the damping piston of said damper being integrally attached to the other of said rigid members.

The secondary movable rod and the main movable rod may be mounted, one on the articulation means connecting one of said rigid members to the first part, the other on the articulation means connecting the other of said rigid members to the second part.

In an advantageous embodiment, the strut comprises a sleeve adhering via its inner surface to the outer surface of a tubular wall of the main body of the damper.

In a further embodiment, also advantageous, it comprises two elastic sleeves adhering via their inner surface to the outer tubular surface of sections integrally attached to the main movable rod and, via their outer surface, to the inner tubular surfaces of sections integrally attached to the main body of the damper. The elastic sleeves may, respectively, at least partially delimit the compensation chamber and the auxiliary chamber. The secondary movable rod may be connected to the main movable rod via at least one flexible elastic-return wall. The flexible elastic-return wall may have a frustoconical form widening out from a sheath in which the secondary movable rod is mounted as far as the inner wall of a tubular section.

Preferably, the damping cylinder, the main rod, the secondary rod and the secondary cylinder have coincident axes.

BRIEF DESCRIPTION OF THE DRAWINGS

The description which follows is given with reference to the appended drawings. It is purely illustrative and has no limiting character.

In these drawings:

FIG. 1 is a diagrammatic representation illustrating the functioning principle of the inner control device of a damper according to the invention;

FIG. 3 is a sectional view according to the line III—III in FIG. 2;

FIG. 4 is a sectional view according to the line IV—IV in FIG. 2;

DESCRIPTION OF THE PREFERRED EMBODIMENTS

Figure 2:
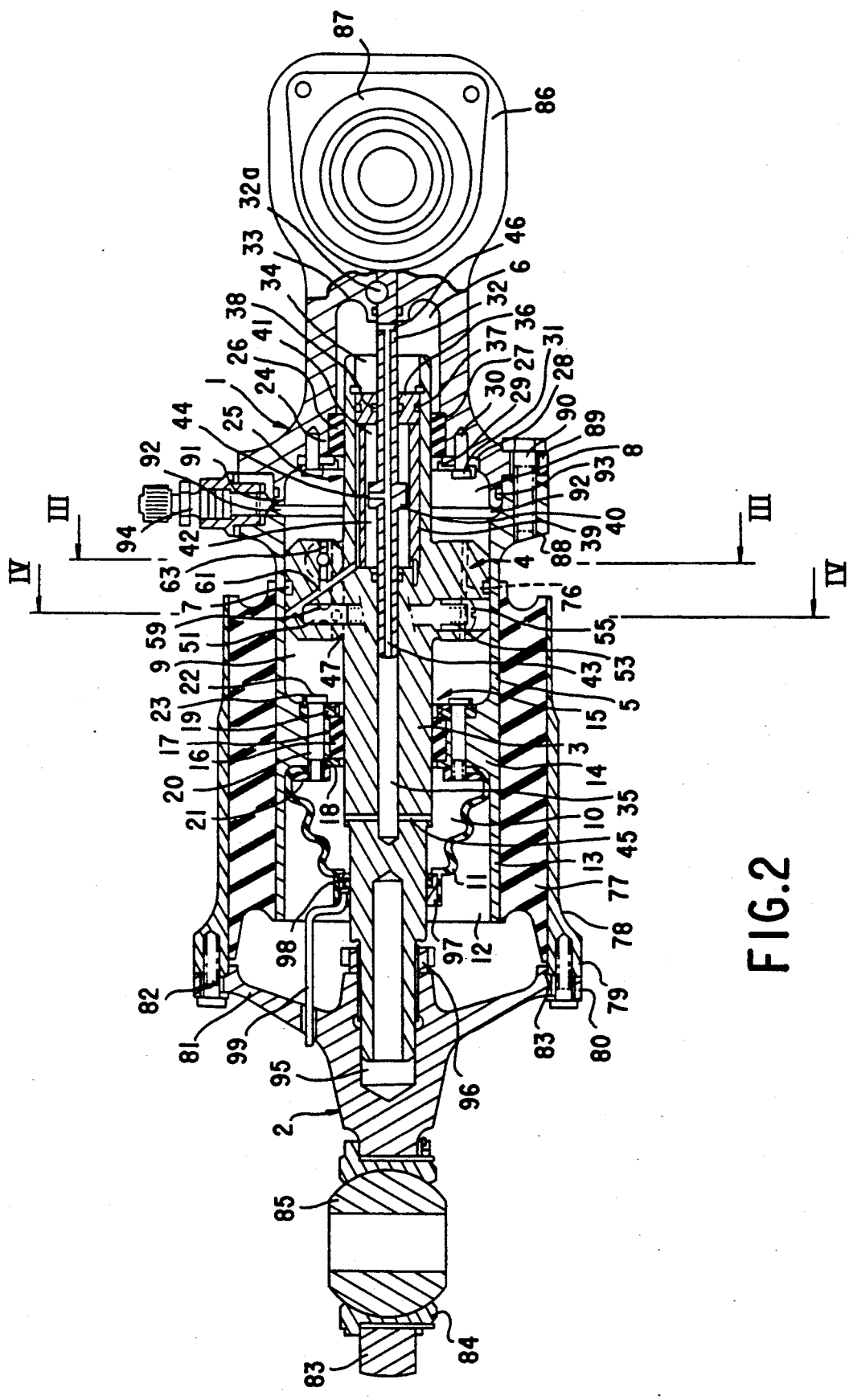
FIG. 2 is a sectional view of a hydroelastic strut according to a first embodiment, equipped with a damper according to the invention.

FIGS. 1 to 4 and 7 show that a hydroelastic strut comprising a damper according to a first embodiment of the invention essentially comprises two rigid bodies 1 and 2 which are movable relative to one another, the rigid body 1 being the main body of the damper, the rigid body 2 being integrally attached to a main rod 3, which supports a damping piston 4 which is movable in translation in a damping cylinder 5 provided in the main body 1.

The main rod 3 passes right through the damping cylinder 5. Its end opposite its end via which it is fixed to the rigid body 2 is displaced in an auxiliary chamber 6 provided in the main body 1 towards one of its ends. This auxiliary chamber 6 has a substantially cylindrical form. Its diameter is slightly greater than the external diameter of the main rod 3 at the level of said end. The piston 4 is a disk whose outer diameter corresponds substantially to the inner diameter of the main cylinder 5 in which it slides in a substantially leaktight manner, the seal between said piston 4 and the main cylinder 5 being provided by an annular dynamic seal 7 surrounding the periphery of said piston 4. In the main cylinder 5, this damping piston 4 delimits two working chambers 8 and 9, that of these two chambers which is nearest to the auxiliary chamber 6 being denoted by 8, the other by 9.

A compensation chamber 10 is also disposed in the main body 1 in the extension of the auxiliary chamber 6 and of the working chambers 8 and 9. This compensation chamber 10 has the main rod 3 passing through it, of which the part disposed opposite the working chamber 9 relative to said chamber 10 is its end via which it is integrally attached to the rigid body 2. This compensation chamber 10 is partially delimited on the inside via a flexible bellows wall 11 which has a form in revolution which is centered on the axis of the main rod 3 and widens substantially from the end of said chamber 10, which is the furthest away from the working chamber 9, towards it other end. This compensation chamber 10 and the bellows 11 are disposed in a cylindrical recess 12 delimited in the main body 1 via a tubular wall 13 which also delimits the main cylinder 5. Said cylindrical recess 12 is open at its end opposite the working chamber 9 and is delimited at its other end via a partition 14 which separates said recess 12 from said main cylinder 5.

This partition 14 has a bore 15 passing coaxially through it, said bore having the main rod 3 passing through it. A ring 16 forming a bearing and annular dynamic leaktight seal is disposed between the inner cylindrical wall 17 of said bore 15 and the main rod 3. This ring 16, made from a friction material, such as bronze, for example, is held in place axially relative to the bore 15 by being gripped between an annular rim 18 surrounding the wall 17 on the inside, at its end on the side of the compensation chamber 10, and a stop part 19. The stop part 19 is flat and annular and is disposed so as to bear on the surface of the partition 14, on the side of the working chamber 9. It is held relative to said partition 14 by means of a screw 20 passing through said partition 14 and whose screw thread interacts with the complementary screw thread with which are equipped tapped bores passing through an annular housing part 21 intended to hold, via one of its edges, the flexible wall of the bellows 11 relative to the partition 14, by gripping said edge between the partition 14 and the housing part 21. The head 22 of a screw 20 bears on the stop part 19 by means of an inserted thin plate 23 which is annular and surrounded by holding lugs, said head 22 being itself disposed in the working chamber 9.

The working chamber 8 is delimited at its end opposite the damping piston 4 by a base 24 with a bore 25 passing through it, in which it is possible to slide the main rod 3. This bore 25 is surrounded by the cylindrical wall delimiting the auxiliary chamber 6. It is also associated with a ring 26 forming a bearing and annular dynamic leaktight seal which, interacting with the wall of the auxiliary chamber 6 and the main rod 3, ensures leaktightness between the working chamber 8 and said auxiliary chamber 6. The dynamic seal 26 is held in place in a shoulder 27 made in the inner wall of the bore 25 by being gripped between an annular lateral wall of said shoulder 27 and a stop part 28 held in place on the base 24, in the chamber 8, by means of the interaction of a screw 30 whose screw threads interact with the screw threads of tapped bores made in the base 24 and whose heads 31 bear against said stop part 28 by means of an inserted thin plate 29. The heads 31 of the screws 30 are disposed inside the working chamber 9. The bearing/seal 26 permits the sliding of the main rod 3 in the bore 25 and provides leaktightness between the auxiliary chamber 6 and the working chamber 9.

The auxiliary chamber 6 has a secondary rod 32 passing through it, which rod extends from the base 33 of said auxiliary chamber 6 on the side opposite the chamber 8, into the main rod 3. In its part which extends, from the damping piston 4, into the working chamber 8 and into the auxiliary chamber 6, the main rod 3 has a tubular recess 34 passing through it, the axis of which is coincident with the axis of said rod 3. This tubular recess 34 is extended beyond the damping piston 4, in the portion of the rod 3 which extends in the working chamber 9 and into the compensation chamber 10, via a tubular channel 35 whose inner diameter is slightly larger than the outer diameter of the secondary rod 32. This channel 35 is central on the axis of the main rod 3, the secondary rod 32 extending partially into said channel 35 in which its free end is disposed and in which it can slide relative to the main rod 3.

A separation disk 36 is disposed in the recess 34, toward the end of the rod 3 which is located in the auxiliary chamber 6, the outer diameter of which disk corresponds substantially to the inner diameter of said recess 34. This disk 36 has the secondary rod 32 passing through it and is associated with annular leaktight seals 37 and 38 which, respectively, on the one hand, provide the static leaktightness between said separation disk 36 and the inner wall of the recess 34, and, on the other hand, the dynamic leaktightness between said disk 36 and the secondary rod 32. A secondary cylinder 39, whose outer diameter corresponds substantially to the inner diameter of said recess 34 and inside which the rod 32 slides, is disposed in the recess 34, between the base of said recess, into which the channel 35 emerges, and the disk 36. In its central part, this rod 32 carries a piston 40 which, in said secondary cylinder 39, delimits two secondary chambers 41 and 42, the chamber 41 being delimited by said secondary cylinder between said piston 40 and disk 36, the chamber 42 being the other of the two chambers.

The secondary piston 40 is mounted slidably in the secondary cylinder 39 with a peripheral viscous restriction play. The secondary rod 32 comprises, inside, a secondary channel 43 which extends in the length of said rod 32, from the auxiliary chamber 6 as far as the free end of said rod 32 disposed in the channel 35. The secondary piston 40 has a supplementary channel 44 passing radially through it, which channel, by virtue of the viscous restriction play, places the inside of the secondary cylinder 39 in communication with the secondary channel 43. The channels 35 and 43 are also associated with channels 45 and 46 which, respectively, pass radially through the main rod 3 and the secondary rod 32, in order to provide the communication between the compensation chamber 10 and the auxiliary chamber 6 by means of the channels 35 and 43. The auxiliary chamber 6, the working chambers 8 and 9, the compensation chamber 10, the channels 35 and 43 to 46 as well as the secondary chambers 41 and 42 are filled with a highly viscous oil. The auxiliary chamber 6, the compensation chamber 10 and the channels 35, 43 to 46 form the elements of a compensation device intended to compensate both for the thermal expansions of the hydraulic fluid and the variations in the volumes of the chambers which contain said fluid.

The thickness of the damping piston 4 has two communication passages 47 and 48 passing through it which are intended to serve as a restricted communication passage between the two working chambers 8 and 9. These two passages 47 and 48 are substantially tubular, their axes extending in the thickness of the piston 4, in a cluster in the same plane, this plane being substantially tangent to the outer surface of the rod 3, the common axis of said piston 4 and of the rod 3 being contained in the intermediate plane of these two straight lines. The ends of these communication passages 47 and 48 which emerge into the chamber 9 are closer to one another than the ends of said communication passages which emerge into the chamber 8 (see FIG. 7).

The piston 4 also has two cylindrical bores 49 and 50, whose axes are perpendicular to the axis of the rod 3 and to the plane of the axes of the communication passages 47 and 48, passing through its inside. These two bores 49 and 50 have the communication passages 47 and 48 passing through them, respectively. In the piston 4, they are closer to the working chamber 9 than the chamber 8. Cylindrical viscous restrictions valves, denoted, respectively, by 51 and 52 are disposed inside these bores 49 and 50, substantially at the level of the communication passages 47 and 48. These valves 51 and 52 are, respectively, each associated with a coiled spring 53 and 54 extending in the bore 49 or 50 with which the valve on which they act is associated, being held in place in said bore 49 or 50 by means of a capsule, denoted, respectively, by 55 and 56, in which said spring 53 or 54 is embedded at its end opposite the valve 51 or 52. Each capsule 55 or 56 is disposed, respectively, in a housing 57 or 58 extending the bore 49 or 50 with which it is associated, at its end disposed from the side opposite the communication passage 47 and 48 relative to the rod 3. The inner surfaces of these housings 57 and 58 are equipped with screw threads which interact with the screw threads with which the capsules 55 and 56 are equipped on their outer surface, it being possible for the position of a capsule 55 or 56 in its housing 57 or 58 thus to be adjusted by an operator in order to adjust the opening pressure of the valve 51 or 52. The housings 57 and 58 emerge at their end opposite the bore outside the damping piston 4. The capsules 55 and 56 are, moreover, respectively equipped, on the surface of their base directly opposite the wall 13, with a slot 55a or 56a intended to interact with an external tool in order to permit said adjustment of the capsule in its housing, for example to interact with a screwdriver. The walls of the piston 4 which respectively partially delimit the chambers 8 and 9 are connected to the cylindrical lateral wall by a frustoconical form, at the level of which the housings 57 and 58 emerge outside the piston 4. The housings 57 and 58 are thus both in communication with the working chamber 9.

Each viscous restriction valve 51 or 52 is equipped with a groove denoted, respectively, by 59 and 60, which surrounds it annularly in its central part. Said groove 59 or 60 has a cross section, in a plane passing through the axis of the bore, in the form of a half-circle whose diameter corresponds substantially to the diameter of the restricted communication passages 47 and 48. Said groove 59 or 60 is intended to connect together, inside the bore 49 or 50 with which its valve 51 or 52 is associated, the two ends of the communication passage 47 or 48 which passes through said bore 49 or 50, when said valve 51 or 52 is positioned in its bore 49 or 50 so that the groove 59 or 60 with which it is equipped is located at the level of said communication passage 47 or 48. At its end disposed on the side opposite the spring 53 or 54, relative to the valve 51 or 52 with which it is associated, there emerges, in each bore 49 or 50, a transportation channel 61 or 62 which extends from said end as far as the secondary chamber 41 or 42, respectively, a portion of the transportation channel 61 extending into the length of the wall of the secondary cylinder 39 in order to emerge into the secondary chamber 41, substantially at the level of the separation disk 36 which delimits said chamber 41 at one of its ends.

As is clearer in FIGS. 1 and 3, a transfer channel 63 or 64, respectively, extending between said transportation channel 61 or 62 and, respectively, the working chamber 9 or 8, emerges in the central part of each of these transportation channels 61 and 62. The opening of each of these transfer channels 63 or 64 is controlled by a differential valve 67 or 68 associated with a seat 65 or 66. The two valves 67 and 68 are spherical valves and are connected together by a joining rod 69. Each of these valves 67 or 68 is movable relative to its seat 65 or 66, respectively, in a housing 70 or 71 in which the portion of the transfer channel 63 or 64 which communicates directly with the chamber 9 or 8 emerges. The arrangement of these valves 67 and 68 is such that the working surface of each one directly associated, respectively, with the chamber 9 or 8 is greater than the surface of each one associated, respectively, with the chamber 41 or 42. The housing 70 or 71 is delimited partially by the inner walls of a cap 72 or 73 mounted by screwing in a bore of the damping piston 4, directly opposite the orifice which passes through the seat 65 or 66 and where the part of the transfer channel 63 or 64 which communicates directly with the transportation channel 61 or 62 emerges. The differential valves 67 and 68 as well as the seats 65 and 66 with which they are associated are disposed symmetrically relative to the intermediate plane of the communication passages 47 and 48. The portion of a bore 49 or 50 in which the spring 53 or 54 is disposed is connected via a conduit 74 or 75, respectively, to the working chamber 8 or 9. The transfer channel 63 or 64 and the transportation channel 61 or 62 together form, respectively, a transfer circuit connecting the working chamber 9 or 8 to the secondary chamber 41 or 42.

The thickness of the damping piston 4 also has a third communication passage 76 passing through it, which passage extends into said piston 4 from one to the other of the two working chambers 8 and 9 parallel to the axis of the rod 3 and substantially in the intermediate plane of the two communication passages 47 and 48. The inner diameter of this communication passage 76 is much smaller than the inner diameter of the communication passages 47 and 48. This passage 76 thus forms a permanent restriction passage of constant cross section.

Referring to FIG. 2, it can be seen that the damper described hereinabove is incorporated into a strut structure which comprises, in a known manner, a rubber sleeve 77 which deforms elastically, essentially in shear, and which is molded between the tubular outer surface of the wall 13 of the main body 1 and the inner wall of a tubular section 78 integrally attached to the body 3. This section 78 is fixed by a flange 79, which terminates it, against the flange 80 of a plate 81 of the rigid body 2, with the aid of twelve screws 82 of which the screw thread interacts with the screw threads with which the bores made in the flange 79 are equipped, and the head of which bears on the outer surface of the complementary flange 80. The plate 81 is centred on the tubular section 78, by means of an inner cylindrical collar 83.

At its end on the side opposite the working chambers 8 and 9 and the compensation chamber 10, the plate 81 carries a fixing lug 83 equipped with a pivot eye 84 and with a pivot 85 for articulating the strut, for example on the boss of the rotor (not shown). The main rigid body 1 is equipped, in the extension of the working chambers 8 and 9 and of the auxiliary chamber 6, at its end opposite the plate 81, with a fixing lug 86 in which is mounted a pivot 87 for articulating the strut, for example on the root of a rotor blade (not shown) or on a sleeve or a shell (also not shown) for joining the blade to the boss.

The cylindrical wall 13 of the main rigid body 1 terminates, beyond the sleeve 77, at the level of its end opposite to its end via which it emerges in front of the plate 81, in a flange 88 interacting with a complementary flange 89 in order to hold, relative to the portion of the main body 1 which carries the sleeve 77, the outer portion of said main body 1 in which the auxiliary chamber 6 is mounted and which carries the pivot 87 and the lug 86 which is associated therewith, an outer wall of said portion defining the base 24 of the working chamber 8. These two flanges 88 and 89 are integrally attached to one another by means of a screw 90 whose screw thread interacts with the screw thread with which bores passing through the flange 88 are equipped and whose head bears on the surface of the flange 89 which is furthest away from the sleeve 77. The flange 89 is positioned relative to the flange 88 by means of a collar 91 with which it is equipped, said collar 91 being housed in an annular recess 92 made in the inner wall of the flange 88 in order to receive it. Between the outer surface of said collar 91 and the inner surface of the wall of the flange 88 defining said recess 92 is disposed a static annular leaktight seal 93. The main body 1 is also equipped, at the level of said flanges 88 and 89, with a filling and purging screw 94 which closes or opens a vent emerging into the main cylinder 5, substantially in the working cylinder 8.

The secondary rod 32 is integrally attached to the base 33 of the auxiliary chamber 6 by conventional securing means such as a transverse pin 32a. Said secondary rod 32, the main rod 3, the main cylinder 5, the secondary cylinder 39 and the auxiliary chamber 6 have coincident axes. The rod 3 is integrally attached to the central boss carrying the plate 81, by interaction with an outer screw thread with which it is equipped at its end at the level of said plate 81, with, on the one hand, the inner screw thread of a bore 95 in which said rod 3 is embedded, and with, on the other hand, the screw thread of an outer counternut 96. This counternut 96 can be gripped with a suitable tool engaged between the plate 81 and the tubular section 78 by placing the main rod 3 up against the partition 14.

The end of the bellows wall 11 delimiting the compensation chamber 10, opposite the end of said wall which is mounted on the partition 14, is integrally attached to a ring 97 in which the main rod 3 can slide, said ring 97 being associated with a dynamic seal 98 ensuring the leaktightness of said compensation chamber 10. A reference rod 99, which extends from said ring 97 as far as the plate 81 which it passes through, is mounted on said ring 97, said reference rod 99 being intended to permit the control of the filling of the compensation chamber 10.

The strut described above is used in the manner presented hereinbelow. When the rigid bodies 1 and 2 have, through the action of the rotation of the blades and of the rotor, a movement relative to one another and move away from their balance position, they are returned towards this position by means of the elastic sleeve 77, the movement also being damped by the assembly forming the damper.

By way of example, as has been shown by the arrows in FIG. 1, the damping piston 4 is displaced in the main cylinder 5 so as to reduce the volume of the chamber 9, which is under compression, and to increase that of the working chamber 8, which is at reduced pressure, which corresponds to a tensile stressing of the strut and of its damper, the oil contained in the secondary chamber 41 is pushed back by the secondary piston 40 towards the valve 51 by means of the transportation channel 61, subject to a leakage flow passing from the secondary chamber 41 to the other secondary chamber 42 via the permanent viscous restriction play around the piston 44.

Figure 8:
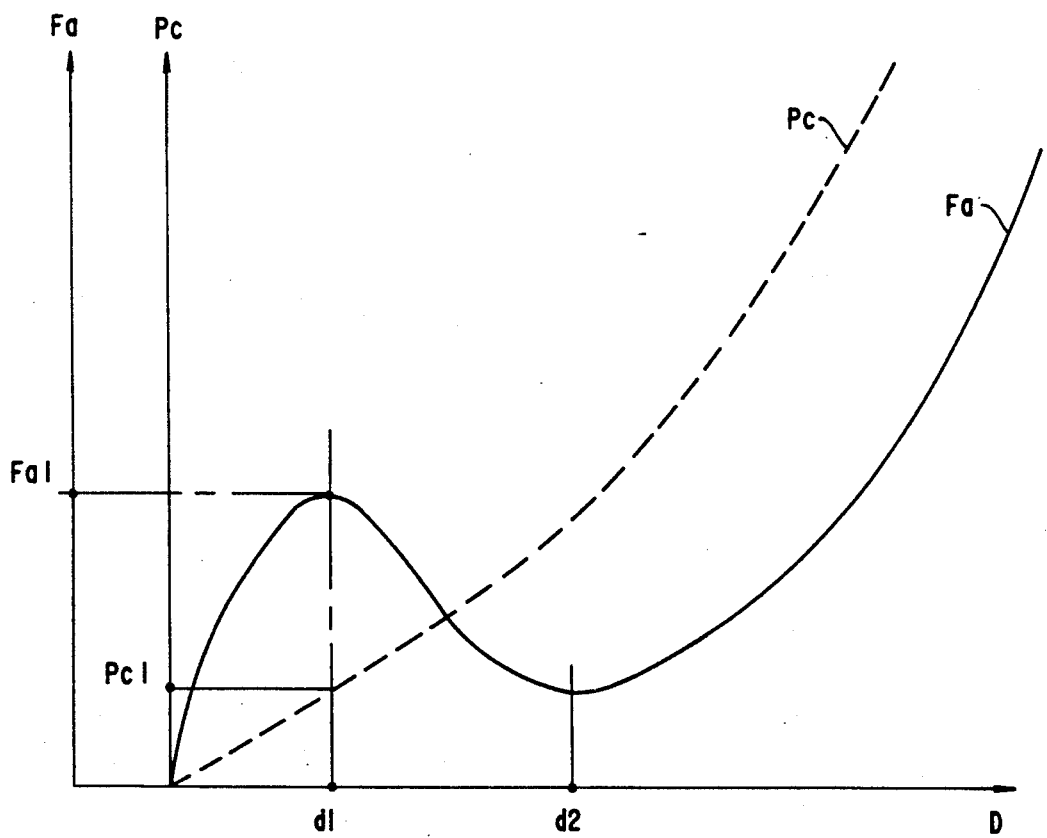
FIG. 8, finally, is a graph illustrating a damping law which can be obtained with a damper according to the invention.

As long as the relative displacement of the bodies 1 and 2 remains sufficiently small, the viscous restriction valve 51 is held under the pressure of the spring 53 in the base of the bore 49. The communication passage 47 then remains closed by said valve 51. At the same time, since the secondary chamber 42 is at a reduced pressure and the pressure of the main chamber 9, which is under compression, is applied to the valve 52 on the side of its return spring 54 penetrating in the bore 50 via the orifice 75, the valve 52 is held on the base of the bore 50 where the transportation channel 62 emerges and the communication passage 48 itself also remains closed. Therefore, the compressed high-viscosity oil passes from the working chamber 9 to the working chamber 8 via the restricted permanent communication passage 76. Since the cross section of this passage 76 has a relatively small diameter, the damping produced is then a high-gradient damping, which corresponds to the start of the curve shown by the graph in FIG. 8.

When the relative displacement of the bodies 1 and 2 increases further, from a predetermined value of the pressure of the oil in the chamber 41, the oil of said chamber 41 in the transportation channel 61 will displace the viscous restriction valve 51 relative to the base on which said valve 51 bears and against the return spring 53. This displacement is all the greater when the relative displacement of the two rigid bodies 1 and 2 is itself large. As the valve 51 is lifted, the groove 59 is gradually positioned opposite the communication passage 47, thus more or less opening the said passage 47, according to whether it is or is not exactly opposite the two ends of said passage 47 on the walls of the bore 49. For the same reason as above, the valve 52 remains bearing on the base of the bore 50 where the transportation channel 62 emerges and closes the restricted communication passage 48. The oil will thus pass essentially from the working chamber 9 to the chamber 8 via the communication passage 47. During the phase of gradual increase in the passage cross section by the groove 59, the damping produced is less than before, which corresponds to the second part of the curve shown by the graph in FIG. 8, that is to say to the part which descends from the vertex Fal, corresponding to a stress peak obtained for a relative displacement d1 resulting in a control pressure Pcl in the secondary chamber 41.

If the relative displacement of the two bodies 1 and 2 increases further, beyond the position in which the groove 59 is exactly at the level of the communication passage 47, the viscous restriction valve 51 will gradually close said communication passage 47 again and give rise to a high-gradient damping, which corresponds to the third part of the abovementioned curve (rising part of the curve on the righthand side of the graph).

During the displacement of the viscous restriction valve 51 towards the end of the bore 49 towards which the capsule 55 which carries the spring 53 is mounted, said viscous restriction valve 51 pushes the oil back via the conduit 74 towards the chamber 8 which is under reduced pressure, which fills up. Since the rod 3 has a diameter which is identical on either side of the damping piston 4, in the chambers 8 and 9, the volume by which said compressed chamber 9 is reduced is equal to the volume by which the chamber 8 under reduced pressure increases. Therefore, the volume by which the chamber 9 is reduced corresponds substantially to the volume of oil which passes from said chamber 9 to the chamber 8 via the communication passages 47 and 76. The small volume of oil pushed back by the viscous restriction valve 51 via the conduit 75 thus constitutes a surplus in said chamber 8. It is discharged by means of the transfer channel 64 and the transportation channel 62 in the secondary chamber 42, which is also at reduced pressure. The differential valve 68 is, in fact, in the open position away from its seat 66, since the valve 67 to which it is connected via the connection rod 69 is held so as to bear on its seat 65 by the differential pressure exerted on it by the compressed oil of the chamber 9, which pressure is transmitted thereto in the chamber 70 by means of the transfer channel 63.

During such a relative displacement in extension of the two rigid bodies 1 and 2 relative to one another, the displacement of the end of the main rod 3 in the auxiliary chamber 6 releases a potential volume for the oil. This variation in volume is compensated for by a transfer of oil from compensation chamber 10 in said auxiliary chamber 6 by means of the elements of the compensation circuit which form the various channels 35 and 43 to 46.

Moreover, FIG. 1 shows that, for reasons of symmetry, the respective roles of the working chambers 8 and 9 and of the various elements associated therewith are interchanged with respect to one another if the two rigid bodies 1 and 2 undergo a relative displacement with respect to one another, no longer in extension but in compression. The only major difference is that a portion of the oil of the auxiliary chamber 6 is then pushed back via the free end of the main rod 3, through the channels 43 to 46 and 35, into the compensation chamber 10. The bellows walls 11 of said chamber 10 expand, the reference rod 99 emerging slightly more from the plate 81.

Referring again to FIG. 8, it can be seen that the principle of functioning, described above, of the damper can be summarised in the following manner: A pressure Pc in the control damper corresponds to a relative displacement D of the two rigid bodies 1 and 2 relative to one another; a balance position of one of the viscous restriction valves of the damper corresponds to this pressure Pc; an opening cross section of the restricted communication passage with which said valve is associated corresponds to this balance position, said opening cross section being determined in advance by construction; a damping stress Fa on the main rod 3 and the damping piston 4 corresponds to this opening cross section. The damping law achieved is essentially determined by the profile of the viscous restriction valves. Such a damper structure thus makes it possible, by constructional play, to achieve virtually any damping law as a function of the damped dynamic displacement.

In the example which has just been described, the damping law is an optimised law more particularly adapted for elastic-return struts with integral damping for the blades of a rotor of an aerodyne with a rotary wing unit. Three damping zones may be distinguished, as a function of the dynamic displacement:

a first zone corresponds to small displacements D to d1 (from 0 to more or less 2 mm), for which it is desirable to have a high damping gradient in order to counteract the ground resonance phenomena;

in a second zone or intermediate zone, which corresponds to the average relative displacements between d1 and d2 (between 2 and 4 mm approximately in absolute value), the level of damping is low, which is, in particular, desirable for stabilised flight configurations;

in a third zone, which corresponds to major displacements beyond d2 (greater than 4 mm approximately in absolute value), that is to say in the case of a load factor, a high damping gradient is again necessary.

Figure 5:
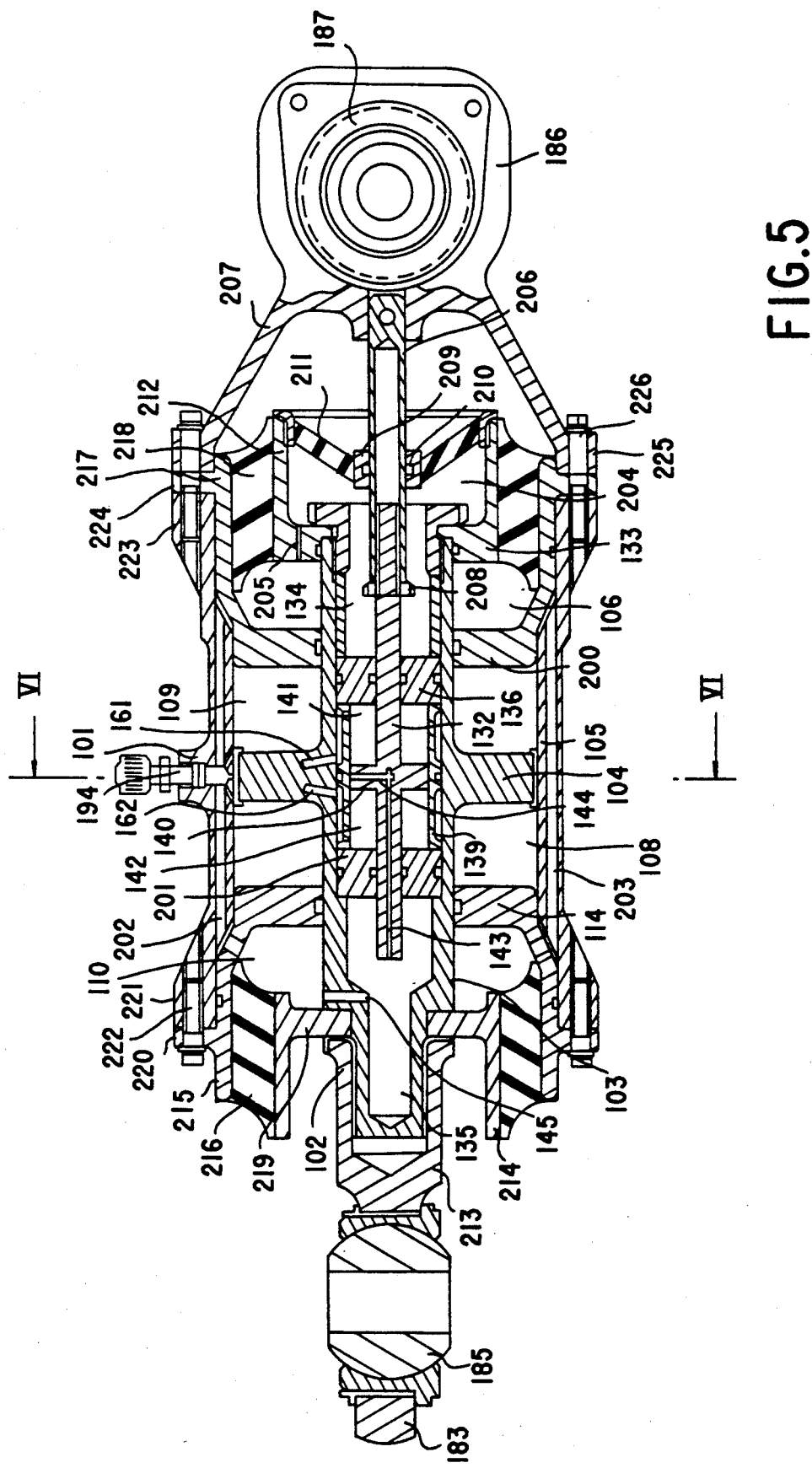
FIG. 5 is a sectional view, similar to FIG. 2, of a hydroelastic strut according to a second embodiment, equipped with a damper according to the invention.
Figures 6, 7:
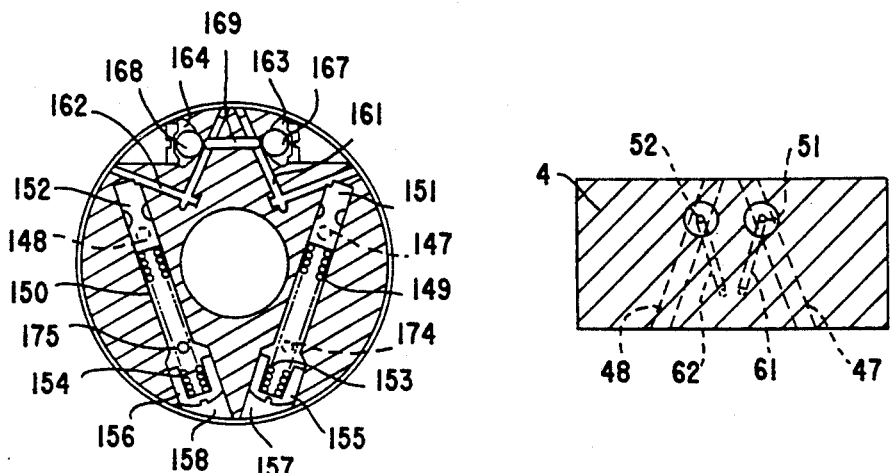
FIG. 6 is a sectional view according to the line VI—VI in FIG. 5.
FIG. 7 is a sectional view according to the line VII—VII in FIG. 4.

FIGS. 5 and 6 show an elastic-return strut with integral damper according to a second embodiment of the invention. For the elements of this second embodiment which are to be found in the first embodiment described above, the same reference numerals have been used, increased by 100.

These figures show that a strut according to this second embodiment of the invention comprises two rigid bodies 101 and 102. The rigid body 102 is integrally attached to a main rod 103 which substantially passes through the other rigid body 101 lengthwise. A damping piston 104 is mounted on this rod 103, sliding in translation in a main cylinder 105 provided inside the rigid body 101. The inner diameter of the main cylinder 105 is slightly greater than the outer diameter of the piston 104 in order to delimit a permanent peripheral viscous restriction play. The axes of the main rod 103, the damping piston 104 and the main cylinder 105 are substantially coincident. The damping piston 104 delimits, with two end partitions 114 and 200, two working chambers 108 and 109 in the main cylinder 105. These two working chambers 108 and 109 are themselves inside a compensation chamber 110 and an auxiliary chamber 106, the partition 114 partially delimiting the compensation chamber 110, the partition 200 partially delimiting the auxiliary chamber 106.

The main rod 103 has a cylindrical recess 134 passing through it lengthwise, extended by a channel 135, A secondary cylinder 139 is delimited in the cylindrical recess 134 between two disks 136 and 201. The main rigid damping body 101 is also integrally attached to a secondary rod 132, part of which extends axially into the main rod 103. This secondary rod 132, in said main rod 103, passes through the auxiliary chamber 106, the working chambers 108 and 109, and partially the compensation chamber 110. This secondary rod 132 also passes through the secondary cylinder 139 lengthwise, its free end being disposed in the channel 135. A secondary piston 140, which delimits, in the secondary cylinder 139, two secondary chambers 141 and 142, is mounted on this secondary rod 132. Said secondary piston 140 has an outer diameter which is slightly smaller than the inner diameter of the secondary cylinder 139 in order to delimit, as in the preceding example, a peripheral viscous restriction play which determines the control pressure law generated by the control damper formed by the secondary piston 140 and the secondary cylinder 139. The secondary rod 132 also has passing through it axially, from the central portion of the piston 140 to its end in the channel 135, a secondary channel 143 which emerges into said channel 135. The piston 140 has a supplementary channel 144 extending from said secondary channel 143 to the periphery of said piston 140 passing radially through it. This channel 144 allows, with the viscous restriction play which exists between the secondary piston 140 and the secondary cylinder 139, communication between the secondary chambers 141 and 142 and the channel 135.

The rod 103 has a supplementary channel 145 passing radially through it, placing said channel 135 and the compensation chamber 110 in communication. The compensation chamber 110 and the auxiliary chamber 106 are connected together by channels 202 and 203 which pass through the rigid body 101 in its wall delimiting the main cylinder 105. The auxiliary chamber 106, the compensation chamber 110, the channels 202 and 203, the channel 135 and the supplementary channels 143 to 145 are elements of a compensation device intended to compensate for the thermal expansions of the hydraulic fluid as well as the variations in the volumes containing said fluid. This compensation device also comprises a charging chamber 204 disposed, in the extension of the compensation chamber 110, of the working chambers 108 and 109 and the auxiliary chamber 106, on the side of said chamber 106 opposite the working chamber 109. The base 133 of the auxiliary chamber 106 has a restricted passage 205 passing through it which connects said auxiliary chamber 106 and the charging chamber 204.

The main rod 103 passes right through the auxiliary chamber 106. The end of said rod 103 opposite to its end via which it is integrally attached to the rigid body 102 is integrally attached to the base 133 of said chamber 106. The cylindrical recess 134 emerges outside the main rod 103 in the charging chamber 204. The secondary rod 132 is mounted on a sheath 206 integrally attached to a plate 207 of the rigid body 101. Said sheath 206 and the secondary rod 132 are integrally attached to one another by the interaction of their complementary screw threads as well as by the interaction of the screw thread of the secondary rod 132 with the screw thread of a counternut 208 which is locked on the free end of the sheath 206. The plate 207 carries a fixing lug 186 on which a pivot 187 is mounted. The sheath 206 is also associated, in its central portion, with a ring 209 which can slide relative to said sheath 206, said ring being associated with an annular dynamic seal 210 ensuring the leaktightness between said ring 209 and said sheath. A frustoconical elastic wall 211, widening from said ring 209 as far as a cylindrical body 212, is mounted on this ring 210. The base 133, the cylindrical body 212, the recess 134, the disk 136 and the flexible wall 211 together delimit the charging chamber 204.

The damping piston 104 also comprises, in its thickness, two bores 149 and 150 (see FIG. 6) in which the valves 151 and 152, respectively, slide, pushed back by springs 153 and 154, respectively, towards the base of said bores 149 and 150. The axes of these two bores 149 and 150 are disposed in a cluster in a cross section of the damping piston 104. Towards the ends of the bores 149 and 150 where said bores 149 and 150 are closest to one another, the springs 153 and 154 are supported by capsules 155 or 156 disposed in housings 157 or 158 extending said bores 149 or 150. Transportation channels 161 and 162 connecting said bores 149 or 150 to the chambers 141 and 142 emerge, respectively, at the other ends of said bores 149 or 150. Transfer channels 163 and 164 connecting, respectively, said transportation channels to the chambers 109 and 108 emerge in these transportation channels 161 and 162. These transfer channels 163 and 164 are, respectively, associated with differential valves 167 and 168 connected together by a connecting rod 169 and controlling the opening and closing of said transfer channels 163 and 164. Towards their ends which carry the capsules 155 and 156, the bores 149 and 150 emerge, by means of conduits 174 and 175, respectively, into the working chamber 108 and the working chamber 109.

The main rod 103 is integrally attached to the rigid body 102 by means of an axial boss 213 which carries a fixing lug 183 associated with a pivot 185. The rod 103 is itself integrally attached to a tubular section 214. This tubular section 214 is connected to a tubular section 215 which laterally extends the partition 114 and substantially surrounds said tubular section 214 via a sleeve 216 in an elastic material which adheres in a leaktight manner to the outer and inner surfaces, respectively, of the sections 214 and 215. At the opposite end of the strut, the cylindrical body 212 is, in the same manner, connected to a tubular section 217, which surrounds it, via a second elastic sleeve 218 which also adheres in a leaktight manner to the sections 212 and 217. The two elastic sleeves 216 and 218 each delimit with, respectively, the partitions 114 and 200, the bases 133 and 219, and a portion of the tubular sections 215 and 217, the compensation chamber 110 and the auxiliary chamber 106.

The part formed by the section 215 and the partition 114 is integrally attached to the central portion of the main body 101, which portion delimits the main cylinder 105 by means of flanges 220 and 221 with which said tubular section 215 and said main cylinder 105 are equipped, respectively. These two flanges 220 and 221 are held relative to one another by means of a screw 222 whose head bears on the flange 220 and whose screw thread interacts with the screw thread of bores passing through the flange 221. Similarly, the part formed by the tubular section 217 and the partition 200, the main portion of the body 101 and the plate 207 are integrally attached to one another by means of flanges 223, 224 and 225, with which they are respectively equipped, said flanges being associated with screws 226 which pass through bores with which said flanges 223 to 225 are equipped, the screw thread of these screws 226 interacting with the screw thread of the bores of the flange 223, the head of said screws 226 bearing on the outer surface of the flange 225, the body of said screws 226 extending through the bores with which the flanges 224 and 225 are equipped.

Moreover, the main cylinder 105 is associated with a purging screw 194 intended to permit the filling of the working chambers 108 and 109, for example with a highly viscous oil.

The functioning of such a strut is substantially identical to the functioning of the strut described above, in terms of its damping portion, and to the functioning of the struts described in the Applicant's Patent Application FR-2,629,163, to which reference will advantageously be made for any further details on this subject. When the two rigid bodies 101 and 102 are moved away from their balance position, they are returned towards one another via the elastic sleeves 216 and 218, all the movement being damped by the damper incorporated in the strut, the damping law being substantially a function of the relative displacement of the two bodies 101 and 102 relative to one another.

In the two examples described hereinabove, it is observed that the control of the viscous restriction openings of the damper by a device linked to the dynamic displacement of this damper, and comprising a secondary or control damper delivering a hydraulic control pressure controlling said viscous restriction openings, makes it possible to obtain, by virtue of this decoupling, a viscous restriction law of the damper which is totally independent of the resulting damping force.

In these two examples, also, in order to compensate for the variations in volume due to thermal expansion or accidental leakages of the hydraulic oil, the compensation chamber is in communication, on the one hand, directly with the control damper via a conduit made in the center of the piston, in order to filter the flow pulses at the use frequency, and, on the other hand, by means of the control damper and by means of differential valves, with the main damper.

It will be clearly understood that, although the damper according to the invention has been described here within the framework of an elastic-return strut with integral damping, in particular for a blade of an aerodyne with a rotary wing unit, it may have numerous other applications.

What is claimed is:

1. An elastic-return strut with integral damping, of elastohydraulic type, in particular for controlling the alternated angular movements of the blades of a rotor of an aerodyne with rotary wing unit in the plane of rotation of said blades, comprising;

two rigid members (1, 2; 101, 102) each equipped with articulation means (84, 85, 86, 87; 184, 185, 186, 187) intended to connect one of the rigid members (1; 101) to a first part, such as a blade or a member for joining said blade to the boss of the rotor, and the other rigid member (2; 102) to a second part, such as said boss of the rotor;

at least one elastic-return member (77; 216, 218) comprising a sleeve in an elastically deformable material adhering in a leak tight manner via its inner and outer lateral surfaces, respectively, between inner and outer rigid tubular sections (13, 78; 214, 215, 217, 212) respectively, substantially coaxial with respect to the axis of the strut and each integrally attached to one, respectively, of the two rigid members (1, 2; 101, 102), so that the sleeve (77; 216, 218) is deformed in shear, when the two rigid members (1, 2; 101, 102) are displaced relative to one another substantially according to the general axis of the strut and when the sleeve (77; 216, 218) exerts an elastic-return action on said rigid member (1, 2; 101, 102) which tends to bring them back into an initial relative position; and a hydraulic damper comprising, in a main body (1; 101), two working chambers (8, 9; 108, 109) with a volume which is variable in opposite directions, said working chambers (8, 9; 108, 109) containing a main viscous fluid intended to pass from one to the other via at least one restricted communication passage (47, 48, 76; 147, 148, 176), through the action of the thrust of a damping piston (4, 104) being displaced in said body (1; 101), an opening cross section of at least one communication passage (47, 48; 147, 148) being controlled by the positioning, relative to said passage (47, 48; 147, 148), of a viscous restriction valve (51, 52; 151, 152) on which a control fluid acts, wherein said control fluid is contained in at least one secondary chamber (41, 42; 141, 142) delimited in a secondary cylinder (39; 139) by a control piston (40, 140) mounted slidably in said secondary cylinder (39, 139), said secondary chamber (41, 42; 141, 142) being associated with a transportation channel (61, 62; 161, 162) of the control fluid from said secondary chamber (41, 42; 141, 142) as far as the viscous restriction valve (51, 52; 151, 152), through the action of the control piston (40; 140), said secondary cylinder (39, 139) and said control piston (40; 140) being integrally attached, one to the main body (1; 101), the other to the damping piston (4; 104) such that a damping law of said control fluid positioning said viscous restriction valve is linked to the relative dynamic displacements of said main body and said damping piston, the main body (1; 101) of said damper forming one of the two rigid members, the damping piston (4;104) of said damper being integrally attached to the other (2; 102) of said rigid members, said damping being dependent upon said relative dynamic displacements of said main body and said damping piston.

2. The strut as claimed in claim 1, wherein a secondary movable rod (32 ; 132) and a main movable rod (3; 103) are mounted, one on the articulation means connecting one of said rigid members to the first part, the other on the articulation means connecting the other of said rigid members to the second part.

3. The strut as claimed in claim 34, wherein the sleeve (77) adheres, via its inner surface, to the outer surface of a tubular wall (13) of the main body (1; 101) of the damper.

4. The strut as claimed in claim 34, which comprises two elastic sleeves (207, 218) adhering via their inner surface to the outer tubular surface of sections (212, 214) integrally attached to a main movable rod (103), and, via their outer surface, to the inner tubular surfaces of sections (215, 217) integrally attached to the main body (101) of the damper.

5. The strut as claimed in claim 4, wherein the elastic sleeves (216, 218) respectively at least partially delimit a compensation chamber (110) and a auxiliary chamber (106).

6. The strut as claimed in claim 3, wherein a secondary movable rod (132) is connected to a main movable rod (103) via at least one flexible elastic-return wall (211).

7. The strut as claimed in claim 6, wherein the flexible elastic-return wall (211) has a frustoconical form widening from a sheath (206), in which the secondary movable rod (132) is mounted, as far as the inner wall of a tubular section (212).

* * * * *